United States Patent
Kuo

(10) Patent No.: US 8,392,784 B2
(45) Date of Patent: Mar. 5, 2013

(54) METHOD AND APPARATUS OF HANDLING TTI BUNDLING RETRANSMISSION

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 847 days.

(21) Appl. No.: 12/541,164

(22) Filed: Aug. 14, 2009

(65) Prior Publication Data

US 2010/0042888 A1  Feb. 18, 2010

Related U.S. Application Data

(60) Provisional application No. 61/089,056, filed on Aug. 15, 2008.

(51) Int. Cl.
*H03M 13/00* (2006.01)
(52) U.S. Cl. .......... 714/749
(58) Field of Classification Search .......... 714/745, 714/748–750, 755, 774, 786, 821
See application file for complete search history.

(56) References Cited

U.S. PATENT DOCUMENTS

| | | | | |
|---|---|---|---|---|
| 6,694,471 | B1 * | 2/2004 | Sharp | 714/749 |
| 2009/0259911 | A1 * | 10/2009 | Tseng | 714/748 |
| 2009/0307554 | A1 * | 12/2009 | Marinier et al. | 714/748 |
| 2010/0111068 | A1 * | 5/2010 | Wu | 370/345 |
| 2011/0038352 | A1 * | 2/2011 | Bergman et al. | 370/331 |

FOREIGN PATENT DOCUMENTS

| | | |
|---|---|---|
| KR | 1020080030941 A | 4/2008 |
| WO | 2008041824 A2 | 4/2008 |

OTHER PUBLICATIONS

R2-085787 Correction and Clarification on TTI Bundling.
Office Action on corresponding foreign application (KR10-2009-0075675), from KIPO dated Oct. 28, 2011.
Alcatel-Lucent: "RAN2 aspects of the solutions for Subframe Bundling", 3GPP TSG-RAN WG2 #61 bis, R2-081446, Mar. 31-Apr. 4, 2008, XP050139195, Shenzhen, China.
Ericsson: "Text Proposal for TTI bundling", 3GPP TSG-RAN WG2 #62, R2-082149, update of R2-081466, May 5-9, 2008, pp. 1/6 to 6/6, XP050139928, Kansas City, USA.
3GPP Document R2-081326, "Reply LS on Uplink Coverage for LTE", Feb. 2008.
3GPP Document R2-082859, "RAN2#62 LTE UP Session Report", May 2008.
3GPP Document R2-083107, "Bundling Issues", Jun. 30, 2008.
3GPP Document R2-083726, "RAN2#62bis LTE UP Session Report", Jun. 30, 2008.
3GPP Document R2-083724, "TTI Bundling", Jun. 30, 2008.
3GPP Document R2-083899, "Text for MAC reset and reconfiguration", Aug. 2008.
Office Action on corresponding foreign application (JP2009-188089) from JPO dated Sep. 20, 2011.
Office Action on corresponding foreign application (KR10-2009-0075675) from KIPO dated Oct. 28, 2011.

* cited by examiner

*Primary Examiner* — Nadeem Iqbal
(74) *Attorney, Agent, or Firm* — Blue Capital Law Firm, P.C.

(57) ABSTRACT

A method for handling Transmission Time Interval (TTI) bundle retransmission in a user equipment (UE) of a wireless communication system is disclosed. The UE operates in a TTI bundling mode. The method includes steps of performing a bundle retransmission of a TTI bundle, which is triggered by a Hybrid Automatic Retransmission Request (HARQ) process responsible for the TTI bundle, and determining whether to generate a non-adaptive retransmission for a current transmission opportunity according to a last received feedback of this HARQ process no matter whether the current transmission opportunity is a first transmission opportunity of the bundle retransmission when no uplink grant for the current transmission opportunity has been received on a Physical Downlink Control Channel (PDCCH).

10 Claims, 4 Drawing Sheets

METHOD AND APPARATUS OF HANDLING TTI BUNDLING RETRANSMISSION

CROSS REFERENCE TO RELATED APPLICATIONS

This application claims the benefit of U.S. Provisional Application No. 61/089,056, filed on Aug. 15, 2008 and entitled "Method and Apparatus for Improving TTI Bundling in a Wireless Communication System", the contents of which are incorporated herein by reference.

BACKGROUND OF THE INVENTION

1. Field of the Invention

The present invention relates to a method and apparatus for handling transmission time interval (TTI) bundling retransmission, and more particularly, to a method and apparatus for handling retransmission of a TTI bundle in a user equipment (UE) of a wireless communication system, so as to avoid improper Hybrid Automatic Repeat Request (HARQ) retransmissions.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

In LTE, a technique of transmission time interval (TTI) bundling is introduced for improving uplink coverage according to the prior art. TTI bundling is performed by repeatedly coding and transmitting a same Transport block in a set of consecutive subframes (e.g. TTI), and those repeatedly transmitted packets are named a TTI bundle. UEs in cell boundary utilizing TTI bundling can reduce transmission delay and signaling of control channels, and enhance reliability and accuracy of transmission, such that LTE uplink coverage can be improved.

According to current specifications, TTI bundling is characterized as below:

(1) The same HARQ process is used for each transmission of a TTI bundle.

(2) TTI bundling is switched on/off per UE with higher layer signaling, e.g. Radio Resource Control (RRC) signaling. When switched on, TTI bundling would apply to all uplink transmissions using Physical Uplink Shared Channel (PUSCH).

(3) A TTI bundle is treated as a single resource, i.e., a single grant and a single HARQ feedback (e.g. acknowledgement signal ACK or non-acknowledgement signal NACK) is used for each TTI bundle.

It is worth noting that the timing relationship between the last transmission of a TTI bundle and its HARQ feedback is the same as the normal HARQ operation (i.e. non-bundled operation), and that the HARQ Round Trip Time (RTT) for TTI bundling is twice the RTT of normal HARQ operation. That is to say, if the last transmission of a TTI bundle occurs at TTI n, the HARQ feedback is received at TTI (n+4); and if a first transmission of a TTI bundle occurs at TTI k, retransmission of the TTI bundle starts at TTI (k+2*HARQ_RTT), where HARQ_RTT represents the round trip time of the normal HARQ operation. In addition, the size of a TTI bundle, i.e. the number of TTIs required to transmit the TTI bundle, is fixed as 4.

According to 3GPP meeting document R2-083726, the number of HARQ processes is reduced from 8 to 4 when TTI bundling is configured. In other words, the number of HARQ processes changes when the UE activates or deactivates the TTI bundling mode. As for detailed HARQ operations for TTI bundling, please refer to related meeting document R2-083724.

As indicated in the above meeting document, the retransmission of a TTI bundle is also a TTI bundle. Besides, within the TTI bundle, HARQ retransmissions are non-adaptive and shall be performed without waiting for feedback from previous transmissions. Compared to new transmissions and adaptive retransmissions which are performed on the resource indicated on PDCCH, a non-adaptive retransmission is performed on the same resource as was used for the last transmission. Related HARQ operation is known by those skilled in the art, and is not narrated herein.

Thus, if the UE does not receive an uplink grant for a current transmission opportunity on PDCCH, the HARQ process of the prior art shall generate a non-adaptive retransmission for the following events:

(1) TTI bundling is not configured, and the last feedback for this HARQ process is an HARQ NACK;

(2) TTI bundling is configured, the current transmission opportunity is for a first transmission within a TTI bundle, and the last received feedback for this HARQ process is an HARQ NACK; or (3) TTI bundling is configured, and the current transmission opportunity is not for a first transmission within a TTI bundle.

That means, when the UE does not receive an uplink grant for a first retransmission opportunity of a retransmission bundle, a non-adaptive retransmission is generated for the first transmission opportunity of the retransmission bundle if the last received feedback for this HARQ process is an HARQ NACK. For the following transmission opportunities of the retransmission bundle, there is no need to check the last received feedback for this HARQ process i.e. non-adaptive retransmissions are always generated.

As a result, if the last received feedback for this HARQ process is an HARQ ACK, the UE shall not generate anon-adaptive retransmission for the first transmission opportunity of the bundle retransmission. But non-adaptive retransmissions are still generated for the following transmission opportunities of the retransmission bundle. Since the HARQ ACK means that the network has received the transport block (TB), there is no need for UE to perform any non-adaptive retransmission unless a PDCCH with uplink grant is received. Otherwise, it may cause interference to other UE's transmission.

On the other hand, if the UE receives an uplink grant for a first retransmission opportunity of a TTI bundle, the UE shall request the HARQ process to generate a new transmission or an adaptive retransmission. In this case, the first transmission of the TTI bundle is generated according to an uplink grant received on PDCCH, while following transmissions of the TTI bundle are still generated in a non-adaptive retransmission way.

SUMMARY OF THE INVENTION

It is therefore an objective of the present invention to provide a method and apparatus for handling TTI Bundling retransmission in a user equipment (UE) of a wireless communication system.

According to the present invention, a method for handling retransmission of a Transmission Time Interval (TTI) bundle in a user equipment (UE) of a wireless communication system is disclosed. The UE operates in a TTI bundling mode. A first transmission of the TTI bundle is generated according to an uplink grant received on a Physical Downlink Control Channel (PDCCH), while follow-up transmissions of the TTI bundle are generated in a non-adaptive retransmission way. The method includes steps of performing a bundle retransmission of the TTI bundle, the bundle retransmission being triggered by a Hybrid Automatic Retransmission Request (HARQ) process responsible for the TTI bundle; and determining whether to generate a non-adaptive retransmission for a current transmission opportunity according to a last received feedback of this HARQ process no matter whether the current transmission opportunity is a first transmission opportunity of the bundle retransmission when no uplink grant for the current transmission opportunity has been received on the PDCCH.

According to the present invention, a communications device for handling retransmission of a Transmission Time Interval (TTI) bundle in a user equipment (UE) of a wireless communication system is disclosed. The UE operates in a TTI bundling mode. A first transmission of the TTI bundle is generated according to an uplink grant received on a Physical Downlink Control Channel (PDCCH), while follow-up transmissions of the TTI bundle are generated in a non-adaptive retransmission way. The communications device includes a processor for executing a program, and a memory, coupled to the processor, for storing the program. The program includes steps of performing a bundle retransmission of the TTI bundle, the bundle retransmission being triggered by a Hybrid Automatic Retransmission Request (HARQ) process responsible for the TTI bundle; and determining whether to generate a non-adaptive retransmission for a current transmission opportunity according to a last received feedback of this HARQ process no matter whether the current transmission opportunity is a first transmission opportunity of the bundle retransmission when no uplink grant for the current transmission opportunity has been received on the PDCCH.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
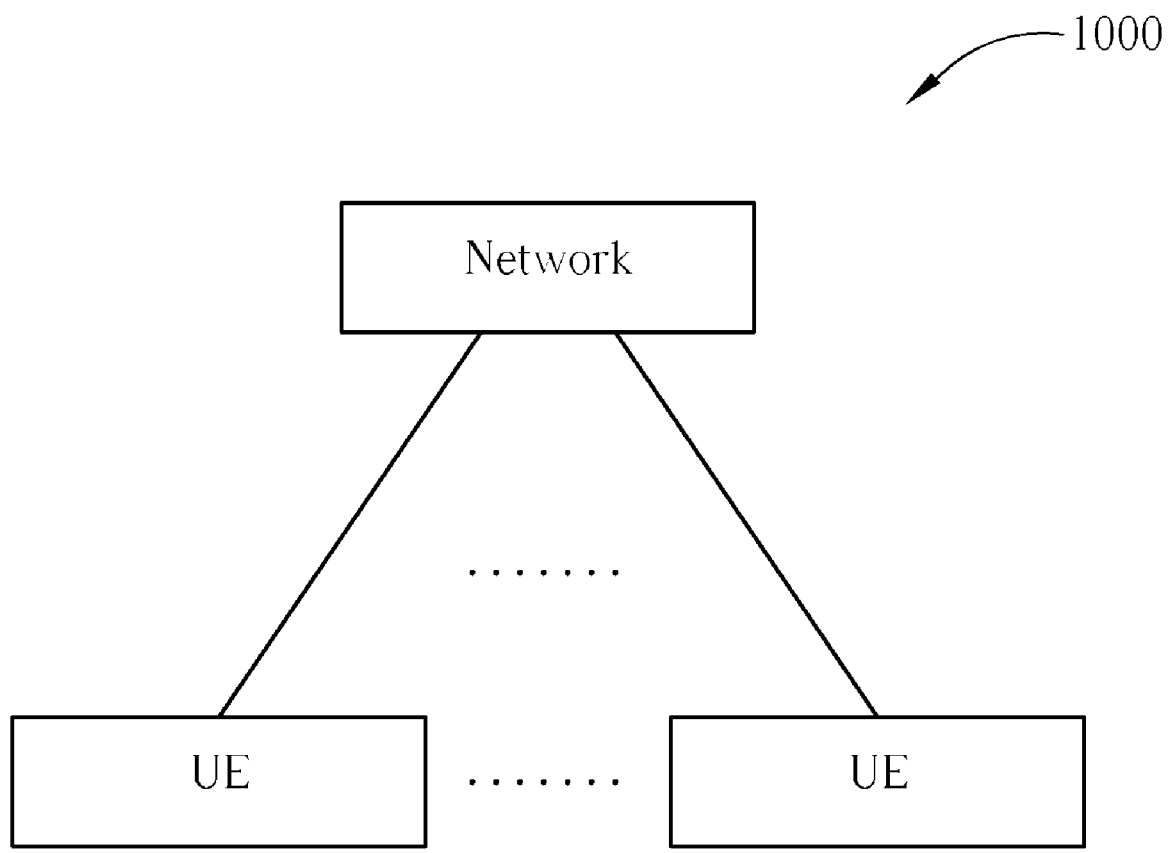
FIG. 1 is a schematic diagram of a wireless communications system.

Please refer to FIG. 1, which illustrates a schematic diagram of a wireless communications system 1000. The wireless communications system 1000 is preferred to be a Long Term Evolution (LTE) system, and is briefly composed of a network and a plurality of user equipments (UEs). In FIG. 1, the network and the UEs are simply utilized for illustrating the structure of the wireless communications system 1000. Practically, the network may comprise a plurality of base stations (Node Bs), radio network controllers and so on according to actual demands, and the UEs can be devices such as mobile phones, computer systems, etc.

Figure 2:
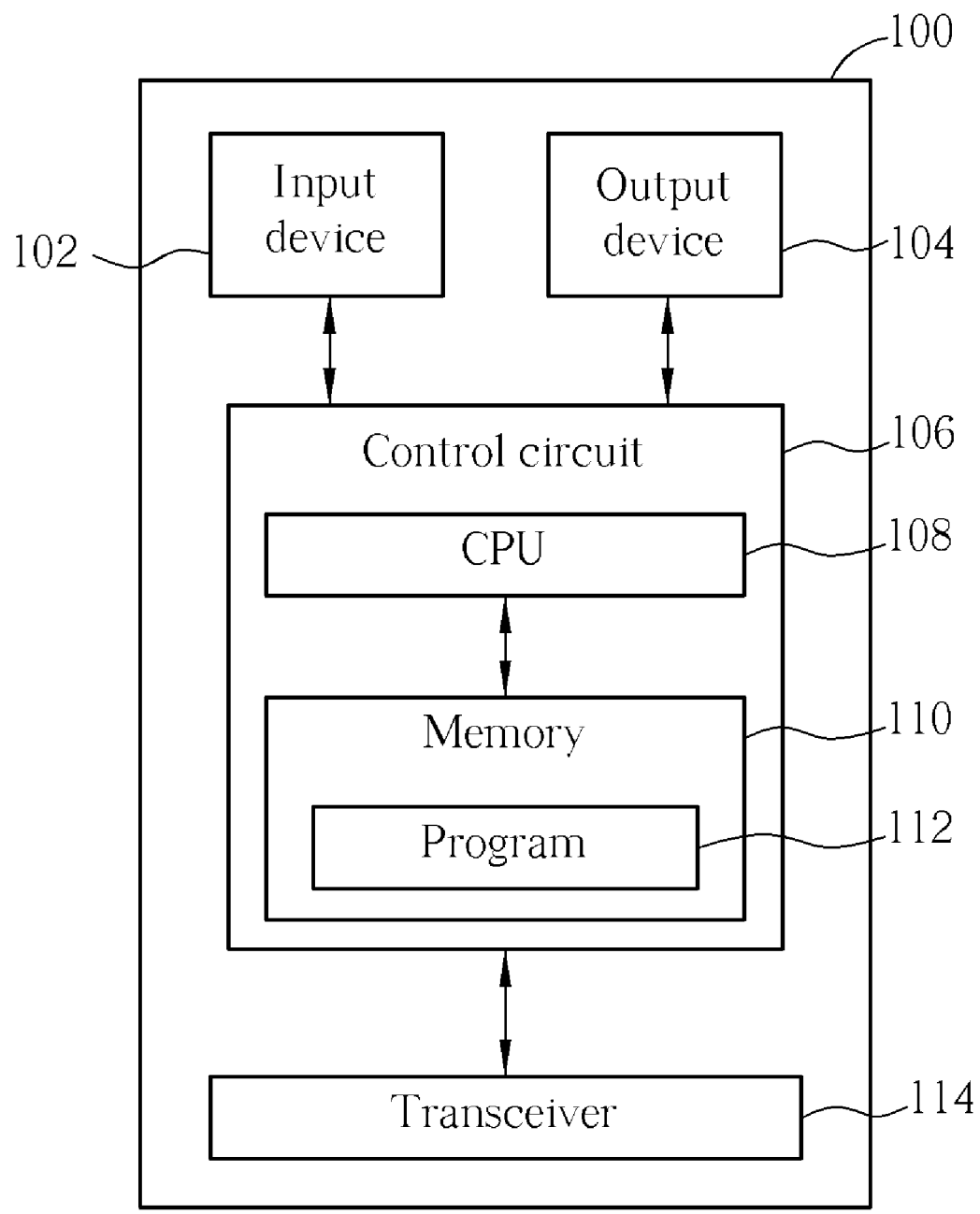
FIG. 2 is a function block diagram of a wireless communications device.

Please refer to FIG. 2, which is a functional block diagram of a communications device 100 in a wireless communications system. The communications device 100 can be utilized for realizing the UEs in FIG. 1, and the wireless communications system is preferably the LTE system. For the sake of brevity, FIG. 2 only shows an input device 102, an output device 104, a control circuit 106, a central processing unit (CPU) 108, a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
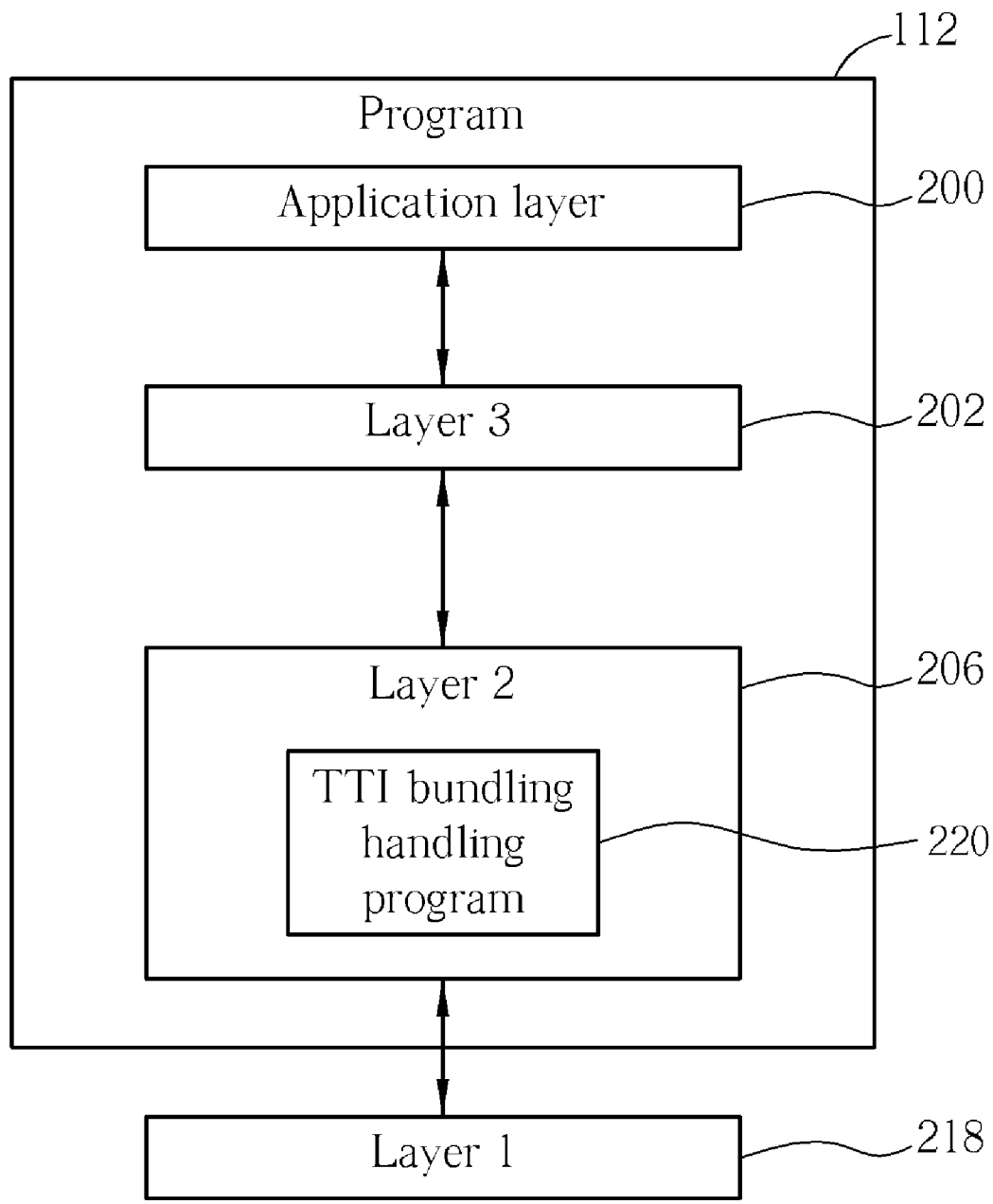
FIG. 3 is a diagram of program of FIG. 2.

Please continue to refer to FIG. 3. FIG. 3 is a schematic diagram of the program 112 shown in FIG. 2. The program 112 includes an application layer 200, a Layer 3 202, and a Layer 2 206, and is coupled to a Layer 1 218. The Layer 3 202 is used for performing radio resource control. The Layer 2 206 includes a Radio Link Control (RLC) entity and a Medium Access Control (MAC) entity, and is used for performing link control. The Layer 1 218 is used for performing physical connection.

In LTE, the MAC layer of the Layer 2 206 can operate in a transmission time interval (TTI) bundling mode for enhancing reliability and accuracy of transmission, so as to improve uplink coverage. TTI bundling is switched on/off per UE with higher layer signaling, e.g. Radio Resource Control (RRC) signaling. When switched on, TTI bundling would apply to all uplink transmissions using Physical Uplink Shared Channel (PUSCH). Within the TTI bundling mode, a single transport block is coded and transmitted at a plurality of consecutive TTIs. In such a situation, the embodiment of the present invention provides a TTI bundling handling program 220 for improving HARQ operation of the TTI bundling mode to avoid improper HARQ retransmissions.

Figure 4:
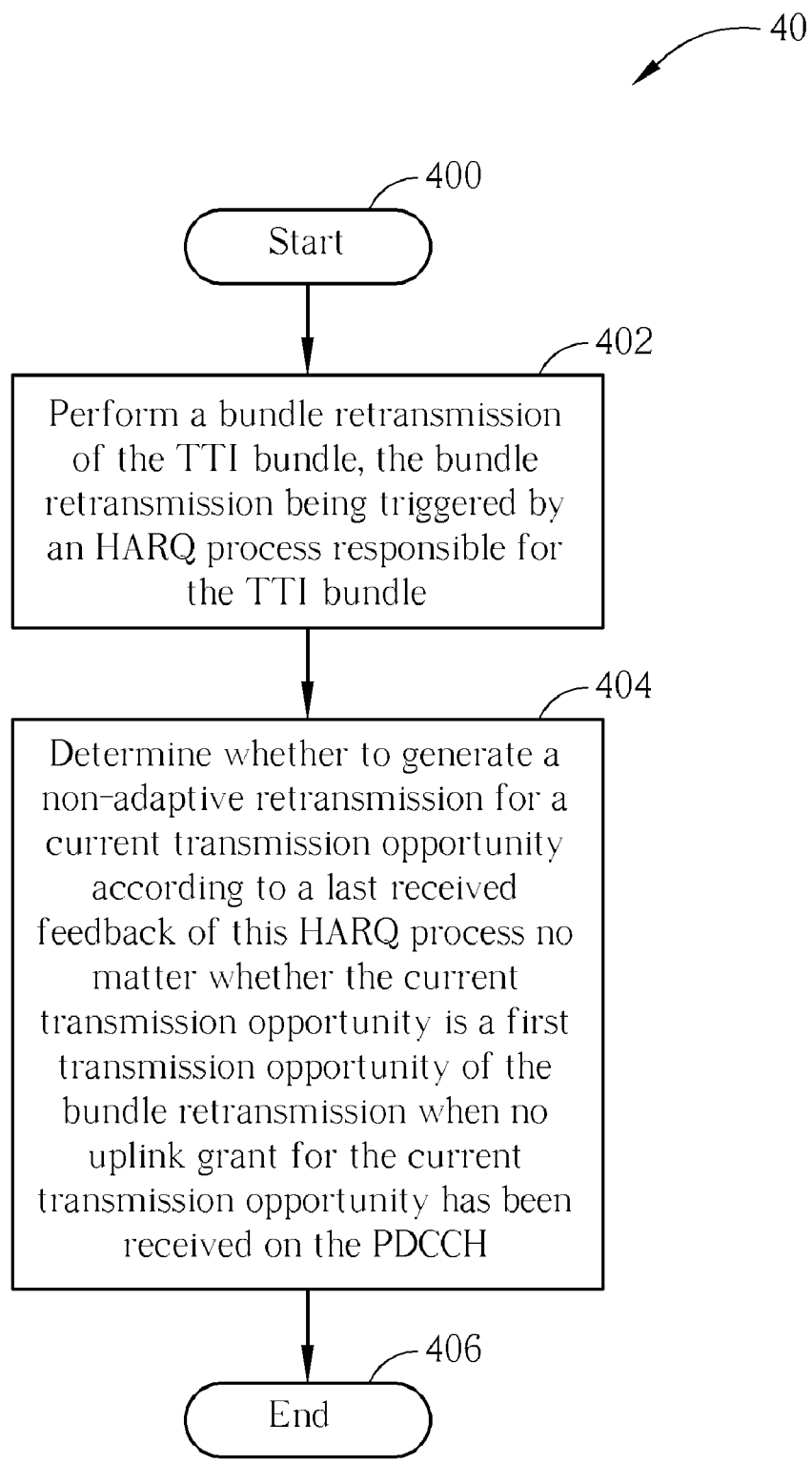
FIG. 4 is a flowchart of a process according to an embodiment of the present invention.

Please refer to FIG. 4, which is a flow chart of a process 40 according to an embodiment of the present invention. The process 40 is used for handling retransmission of a TTI bundle in a UE of the wireless communication system 1000. The UE operates in a TTI bundling mode. A first transmission of the TTI bundle is generated according to an uplink grant received on a Physical Downlink Control Channel (PDCCH), while follow-up transmissions of the TTI bundle are generated in a non-adaptive retransmission way. The process 40 can be compiled into the TTI bundling handling program 220, and includes the following steps:

Step 400: Start.

Step 402: Perform a bundle retransmission of the TTI bundle, the bundle retransmission being triggered by an HARQ process responsible for the TTI bundle.

Step 404: Determine whether to generate a non-adaptive retransmission for a current transmission opportunity according to a last received feedback of this HARQ process no matter whether the current transmission opportunity is a first transmission opportunity of the bundle retransmission when no uplink grant for the current transmission opportunity has been received on the PDCCH.

Step 406: End.

According to the process 40, the UE according to the embodiment of the present invention performs a bundle retransmission of a TTI bundle. The bundle retransmission is triggered by an HARQ process responsible for the TTI bundle. If no uplink grant for a current transmission opportunity has been received on the PDCCH, the UE shall determine whether to generate a non-adaptive retransmission for the current transmission opportunity according to a last received feedback of this HARQ process no matter whether the current transmission opportunity is a first transmission opportunity of the bundle retransmission.

Therefore, when the TTI bundling mode is activated, if the UE does not receive any uplink grant for the current transmission opportunity on PDCCH, no matter whether the current transmission opportunity is the first transmission opportunity of the bundle retransmission, the UE according to the embodiment of the present invention first checks if the last received HARQ feedback is an HARQ NACK, and determines whether to generate a non-adaptive retransmission for the current transmission opportunity. As a result, the embodiment of the present invention prevents the HARQ process from generating unnecessary retransmissions, and enhances system efficiency.

In other words, when the bundle retransmission is performed, if the last received feedback of this HARQ process is an HARQ ACK, the UE would not generate the non-adaptive retransmission for the current transmission opportunity, and conversely, if the last received feedback of this HARQ process is an HARQ NACK, the UE would generate the non-adaptive retransmission for the current transmission opportunity.

It is noted that the bundle retransmission is triggered at a time an HARQ round trip time (RTT) after the first transmission of the TTI bundle, and that the HARQ RTT is twice an HARQ RTT of a non-bundled HARQ transmission. Detailed operation of the TTI bundling mode can be found in related specifications, and is not narrated herein.

In summary, the embodiment of the present invention provides a method for handling retransmission of a TTI bundle in a UE of a wireless communication system, so as to avoid improper non-adaptive retransmissions and enhance system performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling retransmission of a Transmission Time Interval (TTI) bundle in a user equipment (UE) of a wireless communication system, the UE operating in a TTI bundling mode, a first transmission of the TTI bundle being generated according to an uplink grant received on a Physical Downlink Control Channel (PDCCH), follow-up transmissions of the TTI bundle being generated in a non-adaptive retransmission way, the method comprising:
   performing a bundle retransmission of the TTI bundle, the bundle retransmission being triggered by a Hybrid Automatic Retransmission Request (HARQ) process responsible for the TTI bundle;
   determining whether to generate a non-adaptive retransmission for a current transmission opportunity according to a last received feedback of this HARQ process no matter whether the current transmission opportunity is a first transmission opportunity of the bundle retransmission or a transmission opportunity within the bundle retransmission when no uplink grant for the current transmission opportunity has been received on the PDCCH;
   generating the non-adaptive retransmission for the current transmission opportunity if the last received feedback of this HARQ process is a non-acknowledgement signal; and
   not generating the non-adaptive retransmission for the current opportunity if the last received feedback of this HARQ process is an acknowledgement signal.

2. The method of claim 1, wherein an operation status of the TTI bundling mode is switched according to an upper layer signaling.

3. The method of claim 1, wherein a single transport block is coded and transmitted at a plurality of consecutive TTIs within the TTI bundle.

4. The method of claim 1, wherein the bundle retransmission is triggered at a time that is an HARQ round trip time (RTT) after the first transmission of the TTI bundle.

5. The method of claim 4, wherein the HARQ RTT is twice an HARQ RTT of a non-bundled HARQ transmission.

6. A communication device for handling retransmission of a Transmission Time Interval (TTI) bundle in a user equipment (UE) of a wireless communication system, the UE operating in a TTI bundling mode, a first transmission of the TTI bundle being generated according to an uplink grant received on a Physical Downlink Control Channel (PDCCH), follow-up transmissions of the TTI bundle being generated in a non-adaptive retransmission way, the communication device comprising:
   a processor for executing a program; and
   a memory coupled to the processor for storing the program;
      wherein the program comprises:
         performing a bundle retransmission of the TTI bundle, the bundle retransmission being triggered by a Hybrid Automatic Retransmission Request (HARQ) process responsible for the TTI bundle;
         determining whether to generate a non-adaptive retransmission for a current transmission opportunity according to a last received feedback of this HARQ process no matter whether the current transmission opportunity is a first transmission opportunity of the bundle retransmission or a transmission opportunity within the bundle retransmission when no uplink grant for the current transmission opportunity has been received on the PDCCH;
         generating the non-adaptive retransmission for the current transmission opportunity if the last received feedback of this HARQ process is a signal; and
         not generating the non-adaptive retransmission for the current transmission opportunity if the last received feedback of this HARQ process is an acknowledgement signal.

7. The communication device of claim 6, wherein an operation status of the TTI bundling mode is switched according to an upper layer signaling.

8. The communication device of claim 6, wherein a single transport block is coded and transmitted at a plurality of consecutive TTIs within the TTI bundle.

9. The communication device of claim 6, wherein the bundle retransmission is triggered at a time that is an HARQ round trip time (RTT) after the first transmission of the TTI bundle.

10. The communication device of claim 9, wherein the HARQ RTT is twice an HARQ RTT of a non-bundled HARQ transmission.

* * * * *